United States Patent [19]

Mott

[11] 4,008,558
[45] Feb. 22, 1977

[54] ADJUSTABLE REEL FOR A HARVESTER PLATFORM

[75] Inventor: Roger Eugene Mott, Bettendorf, Iowa

[73] Assignee: Deere & Company, Moline, Ill.

[22] Filed: July 2, 1975

[21] Appl. No.: 592,785

[52] U.S. Cl. .................................................. 56/226
[51] Int. Cl.² ........................................ A01D 57/02
[58] Field of Search ............................ 56/219–227, 56/14.3–14.6

[56] References Cited

UNITED STATES PATENTS

| 2,644,289 | 7/1953 | Hume | 56/226 |
| 2,795,921 | 6/1957 | Hume | 56/226 |
| 2,823,511 | 2/1958 | Beaty | 56/226 |
| 3,546,863 | 12/1970 | Connolly | 56/226 |
| 3,703,060 | 11/1972 | Grawohl et al. | 56/226 |

*Primary Examiner*—Russell R. Kinsey

[57] ABSTRACT

A self-propelled combine has a forward transversely elongated cutting platform with a cutting mechanism along its leading edge and a pickup type reel spanning the width of the platform above the cutting mechanism. The reel is carried between a pair of vertically adjustable arms having quadrant type support members at their forward ends and carrying transverse pivots on which adjustable support elements are swingable and lockable to the support member by a locking device associated with the quadrant. The adjustable elements in turn support the reel shaft, which is driven through a chain drive by hydraulic motor attached to the adjustable element. A plurality of transversely spaced spiders are attached to the shaft and carrying rockshafts at their outer ends, which are connected to eccentric spiders at the opposite ends of the reel via crank arms, the eccentric spiders also being journaled in the adjustable members. A plurality of fingers depend from the respective rockshafts and the rockshafts are rocked during rotation of the reel so that the fingers maintain a constant attitude relative to the ground. The fingertips generate a cylinder that is coaxial with the pivot axis for the adjustable element, and by rocking the adjustable element about the pivot, the attitude of the pickup fingers can be changed without changing the position of the cylinder generated by the fingertips.

10 Claims, 3 Drawing Figures

FIG. I

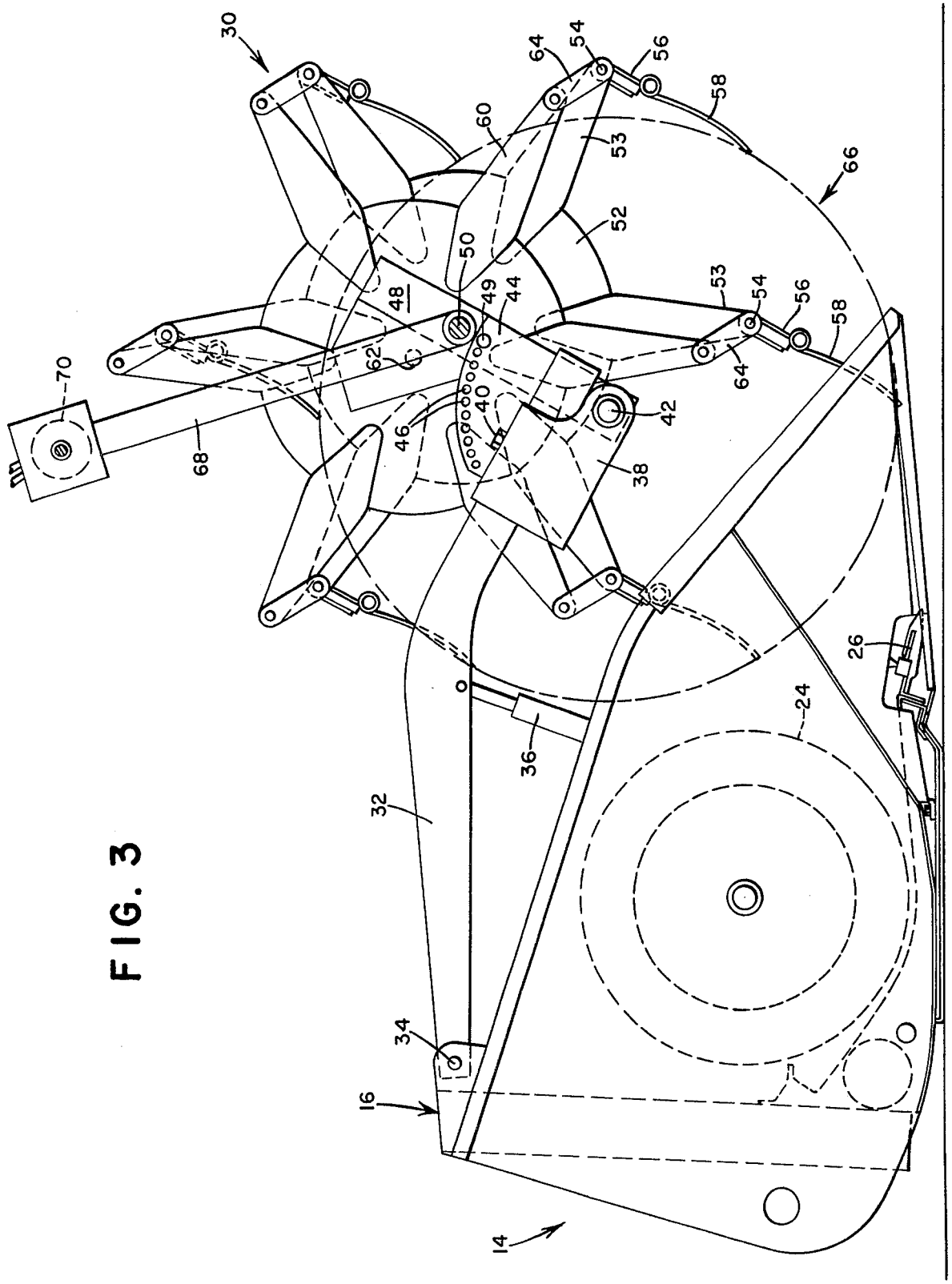

ADJUSTABLE REEL FOR A HARVESTER PLATFORM

BACKGROUND OF THE INVENTION

This invention relates to a harvester reel and more particularly to a pickup type harvester reel of the type that has a plurality of fingers with the fingertips generating a cylinder as the reel rotates.

Conventionally, the fingers are mounted on transverse rockshafts that are connected to an eccentric member relative to the main reel shaft by crank arms, that cause the rockshaft to rock during rotation of the reel, whereby the fingers maintain a generally constant attitude or angle relative to the ground. Generally the fingers are maintained in a relatively vertical condition. However, in some cases, such as when the harvester is operating in a down crop, it is desirable that the fingers incline downwardly and rearwardly from the rockshafts to provide a more aggressive lifting action. Conversely, if the harvester is being operated in a tall standing crop, it is often desirable to tilt the fingers in the opposite direction, so that they incline downwardly and forwardly from the rockshafts.

It is known to vary the angle or attitude of the fingers by adjusting the eccentric member. However, in previous adjustable reels, the eccentric member has been adjusted relative to the reel shaft, which has caused a shift in the path generated by the fingertips. Normally the relationship between the fingertips and the cutter bar is very important and the fingertips are operated as close to the cutter bar as possible. Thus, adjustment of the angle of the fingers has required a repositioning of the reel to obtain the optimum position of the fingertips relative to the cutter bar. Failure of the operator to adjust the reel after adjusting the angle of the reel fingers in many cases causes the reel tips to become caught in the cutter bar. Thus, adjustment of the angle of the fingers to accommodate a change in crop conditions has normally necessitated as adjustment of the reel position.

It is also known to provide a hydraulic motor for driving such a reel, the motor being powered by the harvester's hydraulic system and being selectively variable from the harvester to change the speed of the reel on the go to accommodate various crop conditions. It is also known to provide for vertical adjustment of such a reel by mounting the reel on vertically adjustable arms, and for fore and aft adjustment of the reel by providing for fore and aft adjustment of the reel supports on the arms. However, the hydraulic motors for driving such reels have been conventionally mounted on the reel arms, so that adjustment of the attitude of the fingers, or adjustment of the fore and aft position of the reel on the reel arms has necessitated an adjustment in the drive from the motor to the reel driveshaft.

SUMMARY OF THE INVENTION

According to the present invention, there is provided an improved adjustable pickup reel. More specifically, means are provided for adjusting the attitude or angle of the pickup fingers on such a reel without affecting the relationship between the fingertips and the rest of the platform. Still more specifically, the above adjustment is accomplished by mounting the reel shaft and the eccentric for rocking the fingers on an adjustable member that is swingable about a transverse pivot coaxial with the cylinder generated by the fingertips as the reel rotates, so that regardless of the angular adjustment, the cylinder generated by the reel fingertips does not shift.

Another important feature of this invention resides in the mounting of the hydraulic reel drive motor on an arm that is carried by the adjustable member, so that the relationship between the hydraulic motor axis and the driven reel shaft does not change regardless of the angular adjustment of the adjustable member, or the fore and aft adjustment of the support members along the reel arms.

BRIEF DESCRIPTION OF THE DRAWINGS

FIG. 3 is a view similar to FIG. 2, but showing the reel adjusted so that the fingers are inclined in their rearwardmost position.

DESCRIPTION OF THE PREFERRED EMBODIMENT

Figure 1:
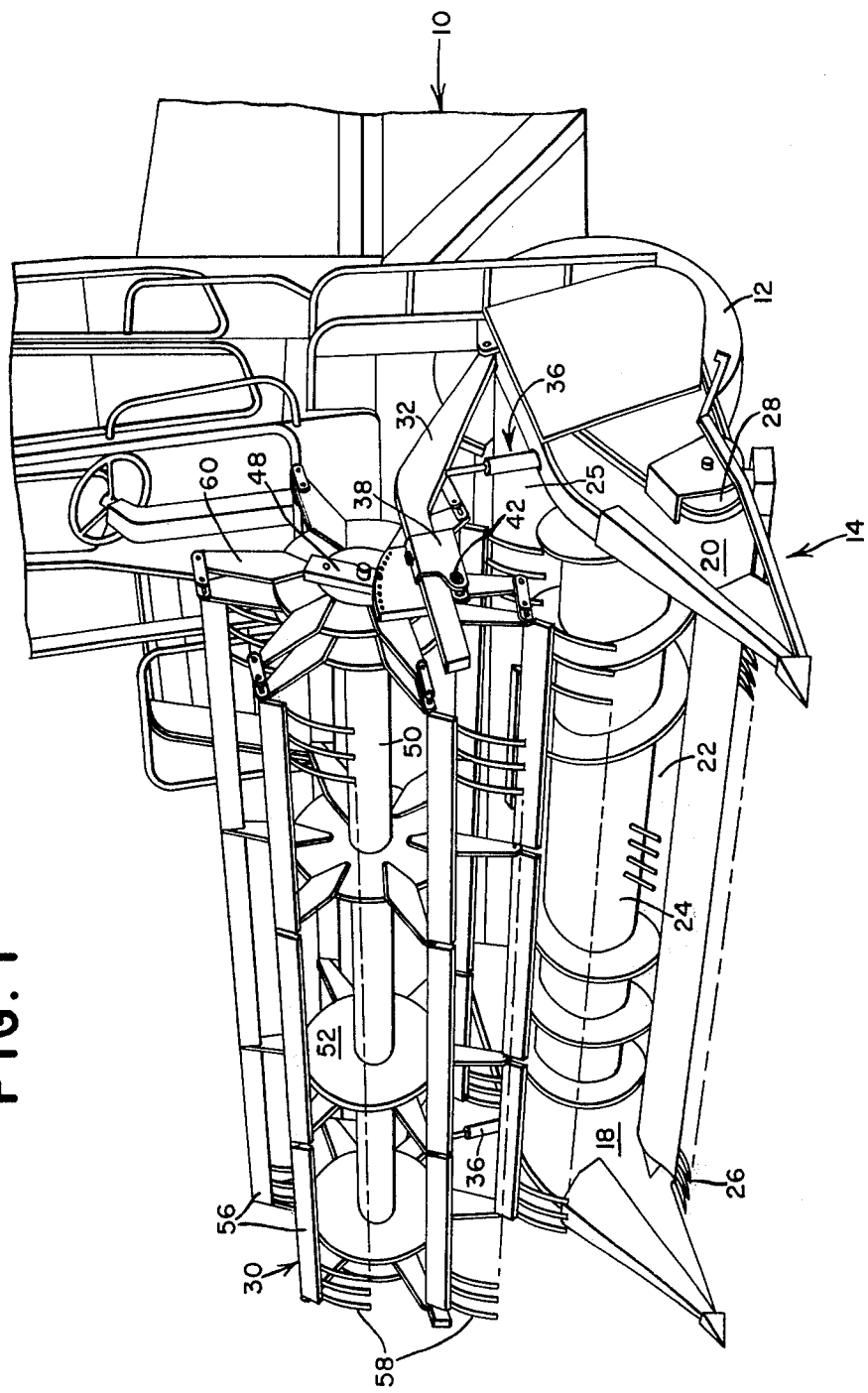
FIG. 1 is a left front perspective view of a self-propelled combine and cutter bar platform having the improved pickup reel mounted thereon.

The invention is embodied in a self-propelled combine having a main separator body, indicated in its entirety by the numeral 10 and mounted on a pair of forward drive wheels 12. As is conventional, the combine has a forwardly extending feeder house (not shown), and a transversely elongated grain harvesting platform 14 is mounted on the forward end of the feeder house. The platform 14 includes a platform frame, indicated in its entirety by the numeral 16, and has right and left side walls 18 and 20 and a transversely extending floor 22 that extends between the opposite side walls 18 and 20. A transverse crop converging auger 24 is mounted immediately above the floor and immediately forwardly of the platform rear wall 25, which is provided with a crop transfer opening (not shown) in registry with the forward end of the feeder house. A transverse cutter bar 26 is mounted along the leading edge of the floor 22 and is driven by a drive 28 on the left side of the platform. All the above represents or less known construction.

A pickup type harvesting reel, indicated generally by the numeral 30, spans the width of the platform 14 forwardly of the auger 24 and above the cutter bar 26. The reel is mounted on the platform by a pair of generally fore and aft reel support arms 32 that are pivotally connected to the platform frame at their rearward ends by transverse pivots 34, the reel support arms being generally above the right and left side walls 18 and 20. The support arms are vertically adjustable, and their position is controlled by a pair of cylinders 26 operative between the arms and the platform side wall.

Mounted on the forward end of each arm is a sleeve-like support element 38 that is slidable between alternate positions along the arm and locked in the desired position by a locking bolt 40. Each support element carries a transverse pivot 42 and has an upright, fore and aft, plate-like quadrant 44 that has a number of transverse bores or holes 46 arranged in an arc concentric with the axis of the pivot 42. Swingably mounted on each pivot 42 is an adjustable element or arm 48 that is selectively lockable in alternate angular positions about the pivot by means of a locking pin 49 extending through one of the holes 46 and through the arm 48.

A tubular reel shaft 50 is journaled in and extends between the opposite adjustable elements or arms 48 and has a number of axially spaced radial members or spiders 52. In the illustrated embodiment, four reel spiders are illustrated and each spider has six radially extending arms 53 that are axially aligned with one another. A transverse rockshaft 54 is journaled in the outer ends of each set of axially aligned spider arms 53 and spans the width of the reel. Each rockshaft 54 has a flat reel bat 56 mounted thereon and also extending the width of the reel. Mounted on each bat are a large number of depending rake fingers or tines 58.

A pair of eccentric spiders 60, that are similar to the reel spiders 52, are mounted at the opposite ends of the reel adjacent the outer reel spiders 52 on transverse pivot shafts 62 carried by the respective adjustable elements or arms 48, the pivot shafts 62 being offset from the reel shaft 50. The outer ends of the eccentric spider arms are pivotally connected to crank arms 64 attached to the opposite ends of each rockshaft 54. The above innerconnection of eccentric reel spiders to the rockshafts carried by the reel spiders is well known, and the reel shaft 50, the eccentric shaft 62, the rockshaft 54 and the pivot connection between the eccentric spider and the crank arms form the pivots of a four-bar linkage that maintains the fingers 58 at a constant attitude relative to the ground as the reel rotates, the tips of the fingers generating a cylinder as the reel rotates, the outline of the cylinder being indicated by the numeral 66. The pivots 42 are so located on the adjustable elements that the cylinder generated by the fingertips is coaxial with the axis of the pivots 42.

Attached to the right hand adjustable element or arm 48 is a motor mounting arm 68 that extends in a radial direction relative to the axis of the reel shaft 50, and a hydraulic motor 70 is mounted on the rearward or outer end of the arm 68. The hydraulic motor 70 is connected to the combine hydraulic system by a pair of hydraulic lines 72 in the known manner, and the motor is provided with a drive sprocket 74 that is connected to a driven sprocket 78 on the right end of the reel shaft 50 by a flexible drive element 76, the sprockets and the drive element being schematically shown in the drawings and partially broken away to more clearly show the reel construction.

In operation, the combine operator vertically positions the reel via the cylinders 36 and also establishes the desired fore and aft position of the reel by locking the support elements 38 in the desired positions on the reel arms 32. Normally the reel is positioned so that the path of the reel fingertips is relatively close to both the cutter bar 26 and the auger 24, although the optimum clearance and position of the reel depends on the particular crop being harvested and crop conditions. Normally, the adjustable elements or arms 48 are positioned somewhere in the mid range of the quadrant 44 so that the reel fingers 58 are generally vertical. However, when the crops are down or lodged and a more aggressive pickup action is required, the reel fingers are adjusted so that they are angled downwardly and rearwardly, as shown in FIG. 3. This adjustment is achieved by pulling the locking pins 49 and swinging the adjustable elements 48 forwardly, the locking pins being reinserted through the forwardmost hole 46 to lock the adjustable elements in their forwardmost position. Since the adjustment is about the axis of the pivot 42, which is concentric with the path of the radial fingertips, the adjustment does not affect the position of the cylinder 66 generated by the fingertips, so that adjustment of the angle of the fingers does not affect the relationship between the fingertips and the cutter bar and the auger, avoiding readjustment of the arms 32 or the support elements 38. While in the illustrated embodiment, it is necessary for the operator to leave the combine to pull the locking pins 49 and reposition the adjustable elements to change the angle of the fingers, a hydraulic cylinder could be provided between the adjustable elements and the support elements to lock the adjustable elements in their desired position, and as is apparent, the hydraulic cylinders could be controlled by the operator from the combine so that the adjustment could be made without the operator leaving the machine to accommodate changes in crop conditions encountered during the harvesting procedure.

Figure 2:
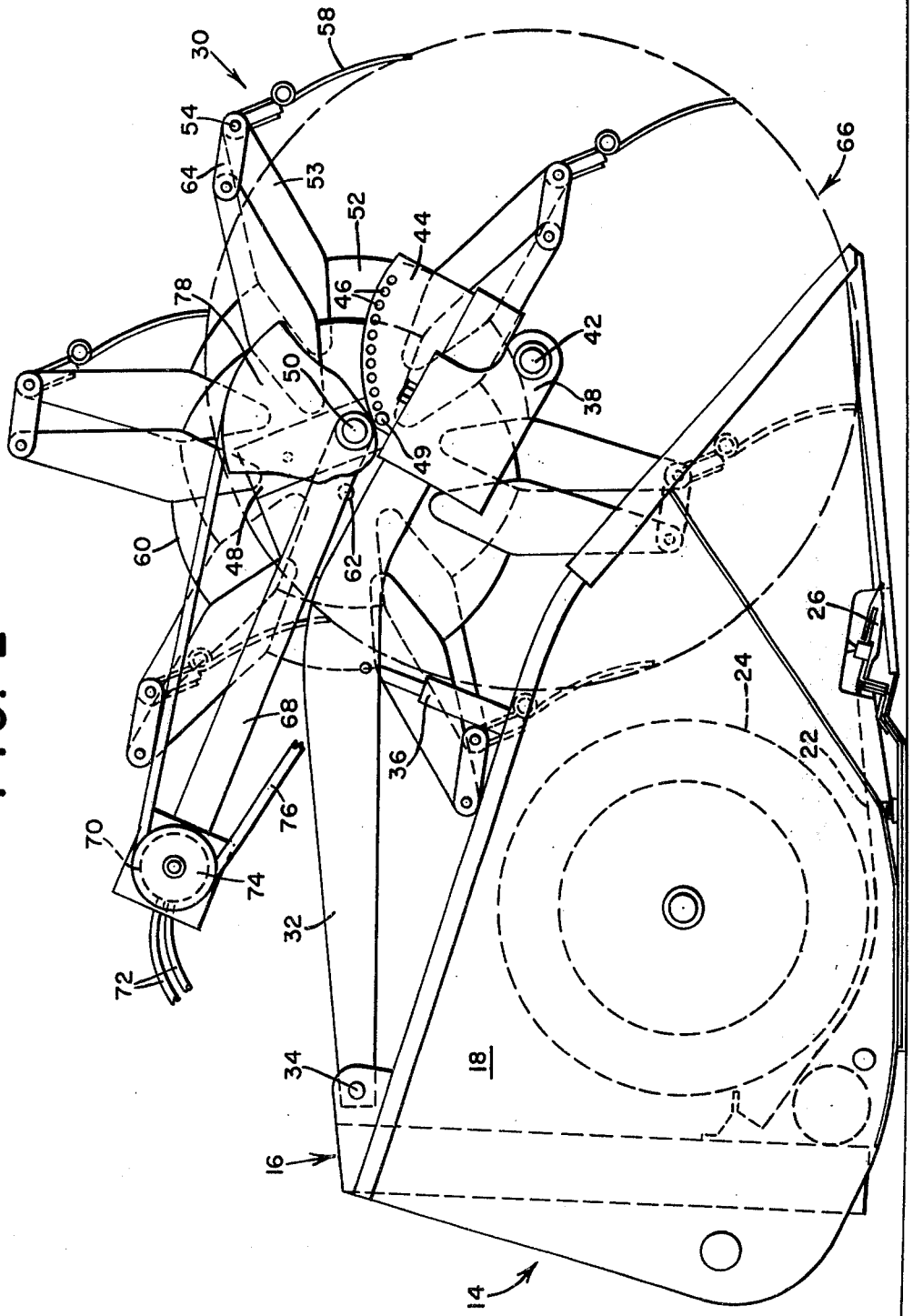
FIG. 2 is a side elevation of the platform with the reel adjusted so that the fingers are inclined in their forwardmost position.

If a tall standing crop were encountered, it is desirable to have the fingers angled downwardly and forwardly as shown in FIG. 2. As previously described, to adjust the reel fingers to such a position, the locking pin 49 is pulled and the adjustable element 48 is swung rearwardly to the desired position and again locked in place, the above adjustment again not affecting the relationship of the tips of the fingers relative to the cutter bar and the auger. As is apparent, the hydraulic motor 70 for driving the reel is mounted on the adjustable member so that its relationship with the reel shaft does not change for the various positions of the adjustable element, obviating any necessity for adjustment in the reel drive as a result of adjustment of the reel.

I claim:
1. A pickup reel for a transversely elongated harvesting platform having opposite sides comprising; a reel supporting structure mounted on the platform and including a pair of support elements respectively disposed at the opposite platform sides; a pair of adjustable elements respectively mounted on the support elements by coaxial transverse pivot means; locking means operative between the support elements and the adjustable elements for selectively locking the adjustable elements in alternate angular positions about said pivot means; a transverse shaft means rotatably supported on and extending between the adjustable elements axially parallel to the pivot means; a plurality of radial members mounted on the shaft means; a plurality of axially transverse rockshafts journaled on the radial members equally offset and parallel to the shaft means axis and substantially spanning the width of the platform; a plurality of radial fingers mounted on each rockshaft and having outer tips; an eccentric rockshaft actuating means rotatably mounted on the adjustable elements axially parallel to the shaft means the pivot means and operatively connected to the rockshafts to rock the rockshaft as the reel rotates so that the fingers maintain a relatively constant attitude relative to the ground, with the fingertips generating a cylinder that is generally coaxial with the pivot means, whereby changing the position of the adjustable elements changes the attitude of the fingers relative to the ground while maintaining a relatively constant position of the cylinder generated by the fingertips.

2. The invention described in claim 1 wherein each adjustable element includes a swingable arm and the locking means includes a plurality of locking elements on each support member adjacent the swingable arm and equally offset from the axis of the pivot means and a locking member operative between each arm and the adjacent locking elements for locking the arm to the support members in selected alternate positions.

3. The invention defined in claim 2 and including a support arm attached to at least one of the adjustable elements, a drive motor mounted on the support arm, and means connecting the drive motor to the shaft for rotating the reel.

4. The invention defined in claim 3 wherein the support structure includes a pair of vertically swingable fore and aft supporting structure arms swingably mounted on opposite sides of the platform on coaxial transverse pivots and a pair of force exerting devices operative between the platform and said arms for vertically adjusting the arms and the reel carried thereby.

5. The invention defined in claim 4 wherein the support members are mounted for fore and aft adjustment on said supporting structure arms into alternate fore and aft positions.

6. The invention defined in claim 1 and including a support arm attached to at least one of the adjustable elements, a drive motor mounted on the support arm, and means connecting the drive motor to the shaft for rotating the reel.

7. The invention defined in claim 1 wherein the radial members comprise reel spiders having radial arms and the rockshaft actuating means comprise at least one spider member similar to and eccentrically mounted adjacent one of said reel spiders.

8. A pickup reel for a transversely elongated harvesting platform having opposite sides, comprising; a reel supporting structure mounted on the platform and including a pair of support elements, respectively disposed at the opposite platform sides; a pair of adjustable elements respectively mounted on the support elements by coaxial transverse pivot means; locking means operative between the support elements and the adjustable elements for selectively locking the adjustable elements in alternate angular positions about said pivot means; a transverse shaft means rotatably supported on and extending between the adjustable elements axially parallel to the pivot means; a plurality of radial members mounted on the shaft means; a plurality of axially transverse rockshafts journaled on the radial members equally offset and parallel to the shaft means axis and substantially spanning the width of the platform; a plurality of radial fingers mounted on each rockshaft and having outer tips; an eccentric rockshaft actuating means rotatably mounted on the adjustable elements axially parrallel to the shaft means and the pivot means and operatively connected to the rockshafts to rock the rockshaft as the reel rrotates so that the fingers maintain a relatively constant attitude relative to the ground, with the fingertips generating a cylinder; a support arm attached to at least one of the swingable elements; a drive motor mounted on the support arm; and means connecting the drive motor to the shaft for rotating the reel.

9. The invention defined in claim 8 wherein the cylinder generated by the fingertips is generally coaxial with the pivot means so that the cylinder maintain a constant position relative to the cutter bar for any selected position of the adjusting element relative to the support elements.

10. The invention defined in claim 9 wherein each adjustable element includes a swingable arm and the locking means includes a quadrant on each support member adjacent a swingable arm and having a plurality of holes offset equidistantly from the pivot means, and locking members connectible to the arm and insertable through one of the holes.

* * * * *